UNITED STATES PATENT OFFICE.

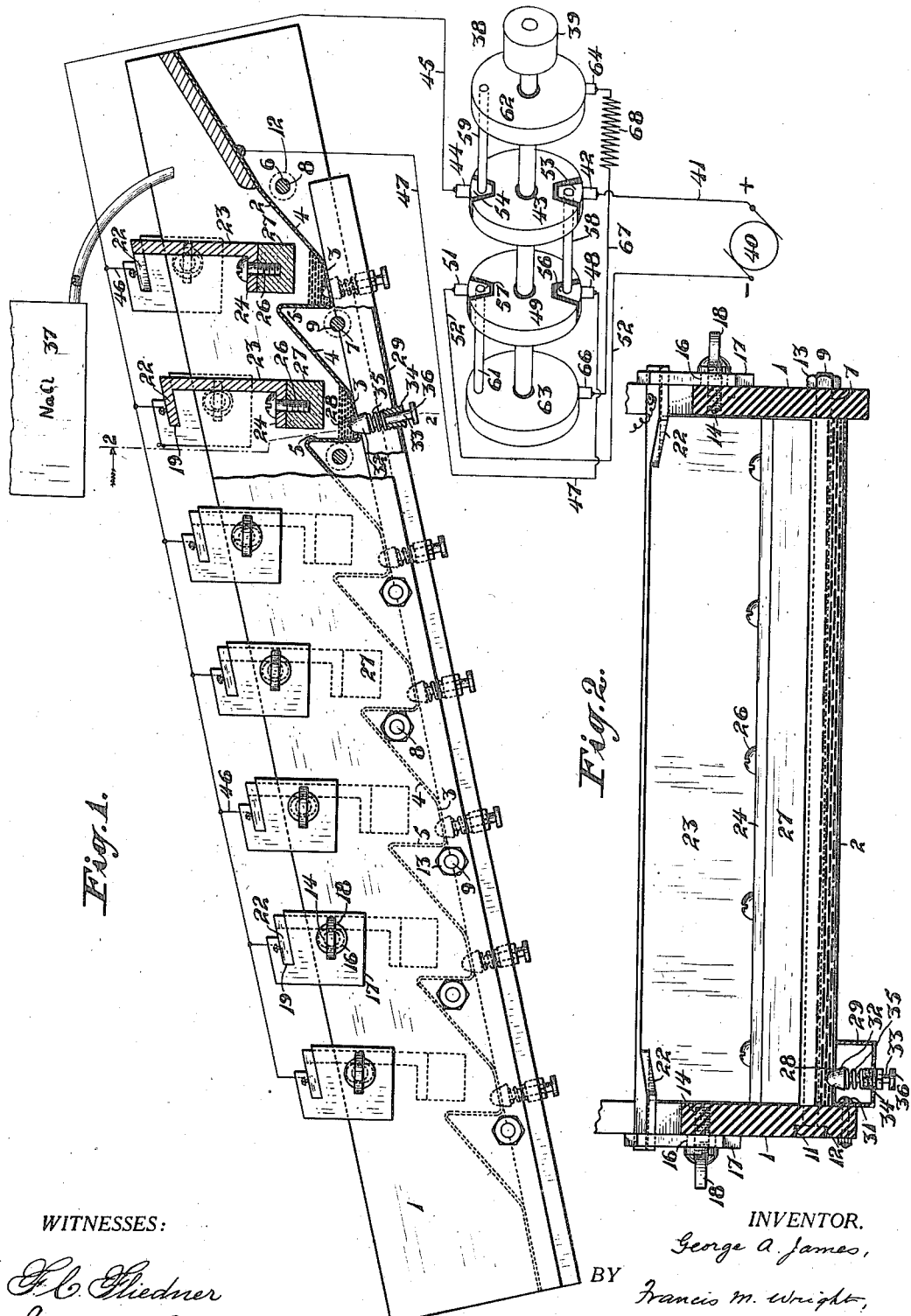

GEORGE A. JAMES, OF SAN FRANCISCO, CALIFORNIA, ASSIGNOR, BY MESNE ASSIGN-
MENTS, OF ONE-HALF TO JAMES H. ALLING AND ONE-HALF TO FRANCIS M. WRIGHT,
BOTH OF SAN FRANCISCO, CALIFORNIA.

APPARATUS FOR ELECTROLYTICALLY RECOVERING METALS.

1,233,363.  Specification of Letters Patent.  Patented July 17, 1917.

Application filed April 15, 1913, Serial No. 761,203. Renewed October 14, 1916. Serial No. 126,628.

*To all whom it may concern:*

Be it known that I, GEORGE A. JAMES, a citizen of the United States, residing at San Francisco, in the county of San Francisco and State of California, have invented new and useful Improvements in Apparatus for Electrolytically Recovering Metals, of which the following is a specification.

The present invention relates to an improved apparatus for recovering metals, particularly precious metals, from comminuted material containing the same.

In the accompanying drawing, Figure 1 is a broken side view of my improved apparatus, certain electrical portions thereof being shown diagrammatically; Fig. 2 is a cross sectional view.

Referring to the drawing, 1 indicates two side walls or frame-pieces of insulating material, and 2 indicates a sheet of metal, preferably copper. Said sheet 2 is pressed to form the bottoms 3, and front and rear walls 4, 5, of a series of electrolytic cells, the side walls being formed by the frame pieces 1, said pieces 1 being formed each with two longitudinal series of holes 6, 7 through which are passed transverse bolts 8, 9, the heads 11 of the bolts being received in countersunk recesses 12 in one of said frame pieces, and nuts 13 being screwed on the threaded other ends of the bolts, passed through the holes in the other frame piece. The two series of holes are formed in the frame pieces at different levels, so that the bolts 8 of one series extend below the sheet 2 immediately below its highest portions, while the other series of bolts 9 extend between the frame pieces at about the level of the bottoms 3. By screwing the nuts upon the bolts the frame pieces may be pressed so firmly against the edges of the sheet 2 that their union is rendered water-tight.

From each frame piece near the top extend outward screws 14 which pass through vertical slots 16 in supports 17, which, by means of clamping nuts 18 screwed on said screws, are clamped at any desired position against the frame pieces. Each support is formed at the top with an oblique slot or recess 19, open at the upper end, and into the recesses 19 of two supports on the two frame pieces are received arms 22 extending forwardly and downwardly from the ends of the top of a holder 23, said holder depending between the frame pieces and over the corresponding cell, and formed at its lowermost portion with a horizontally extending flange 24. To said flange is secured by screws 26 an anode 27, depending into said cell, and preferably formed of graphite or other insoluble material. In each cell is a sufficient quantity of mercury, which, when it is desired to clean up, is permitted to flow out of said cell through a hole 28 in its bottom and into a conduit or trough 29 extending longitudinally beneath all of the cells, one wall of said conduit being secured to the lowermost portion of one of said frame pieces by bolts 31. Said hole 28 is normally closed by a valve 32 having a stem 33 slidable in a guide 34 screwed in the bottom of the conduit 29, and the valve is normally pressed upward, to close the hole 28, by a spring 35 coiled around said stem, against which spring, however, the valve can be withdrawn, to open the hole 28, by the fingers applied to a cross member 36 on the lower end of said valve stem.

The finely comminuted metalliferous pulp, mixed with a suitable electrolyte, as a common salt solution, dropping from a vessel 37, flows in succession over the mercury in the several cells, and beneath the anodes 27 therein.

A periodically reversed current is caused to flow between said anodes and cathodes, said current being reversed by a reverser 38 shown diagrammatically in Fig. 1. Said reverser is rotated at a suitable speed, about 500 revolutions per minute, by a pulley 39. During the greater part of the rotation of the reverser, the current passes from the positive pole of the generator 40 by a wire 41 to a brush 42, conducting disk 43, brush 44, diametrically opposite to the brush 42, wire 45 and branch wires 46 to the anodes 27, through the cells and the mercury therein to the copper sheet, then by the wire 47, and a brush 48, conducting disk 49, diametrically opposite brush 51, wire 52, to the negative pole of the generator. Said disks 43, 49 have, however, in their circumference each two diametrically opposite sectors, namely, the sectors 53, 54, of the disk 43, and the sectors 56, 57, of the disk 49. The sectors 53 and 56 are connected with each other by a conductor 58, and the sectors 54 and 57 are connected by conductors 59, 61 respectively with the conducting disks 62, 63, forming part of the rotating reverser, against which contact respectively brushes 64, 66, connected by a wire 67 through a resistance 68. When the sectors 53 and 56 come under the brushes 42 and 48, and therefore also the sectors 54 and 57 come under the brushes 44 and 51, the current then flows as follows:— from the positive pole of the generator by wire 41, brush 42, sector 53, conductor 58, sector 56, brush 48, wire 47, to the cathode side of the cells, through said cells in the reverse direction to the anodes 27, then by the wires 46, wire 45, brush 44, sector 54, conductor 59, disk 62, brush 64, resistance 68, wire 67, brush 66, disk 63, conductor 61, sector 57, brush 51, wire 52, to the negative pole of the generator. Therefore, for a short portion of the rotation of the reverser, the current passes in the reverse direction from the cathodes to the anodes. Such is also the case if the sectors 54 and 57 come underneath the brushes 42 and 48. In that case the circuit is as follows:—from the positive pole of the generator by the wire 41, brush 42, sector 54, conductor 59, disk 52, brush 64, resistance 68, wire 67, brush 66, disk 63, conductor 61, sector 57, brush 48, conductor 47, to the cathode side of the cells, then through the cells to the anodes, wires 46, and wire 45, brush 44, sector 53, conductor 58, sector 56, brush 51, wire 52 to the negative pole of the generator. By reason of the interposition of the resistance 68 the fall of potential in passing through the cells from the cathode to the anodes is very small compared with that in passing from the anodes to the cathode.

In seeking to explain the chemical reactions which occur, the electrolyte employed will, for the purpose of illustration, be assumed to be a solution of common salt. When the direct current is flowing, a partial separation by electrolysis takes place of the ions of the sodium-chlorid and of the water. The sodium and hydrogen ions travel to the surface of the mercury, forming sodium hydrogen amalgam, and the chlorin and hydroxyl ions travel to the graphite anode, where the hydroxyl ions combine to form water and oxygen, and the gases chlorin and oxygen are given off.

Now when the electric current is sent through the cell in the reverse direction, the sodium and hydrogen ions are separated from the mercury and unite with the negative hydroxyl ions to form sodium hydrate and water, while hydrogen is given off at the graphite electrode, to which the current through the cell is passing.

Since the association of the positive sodium and hydrogen ions with the negative hydroxyl ions is accompanied by an evolution of sensible energy in the form of an electric current, the necessity for sending through the cell an externally-created reverse current may not at once be apparent. It is known that positive ions travel through an electrolyte with the electric current. Whether in a liquid metal, as mercury, the ions of a dissolved metal, like sodium, very near the positive end of the electro-chemical series, also travel with the current or whether the electrons slip from one ion to another as in solid conductors, has not, to my knowledge, been definitely established. The former theory, however, appears to be more congruent with the fact of sodium being soluble by mercury. If such be the case, then it would require an extraneous reverse current to move those sodium ions which had penetrated below the surface back to said surface where they could come into contact with the electrolyte. Whatever may be the reason, however, it is found that by such extraneous reverse current the best results are obtained.

The value of the reagents obtained in the electrolytic cell are well known.

The chlorin liberated at the anode in the electrolytic stage dissolves fine particles of gold in the regenerative stage, when it is no longer prevented from doing so by the action of the direct current, and forms trichlorid of gold. At a subsequent electrolytic stage, the tri-chlorid of gold is decomposed and gold is deposited upon the mercury cathode.

The caustic soda attacks greasy or organic coatings of gold, or of the surface of the mercury, and renders said surface bright and clean and in the best possible condition for amalgamation.

The hydrogen given off at the upper portion of the cell in the second or regenerative stage is of great value in attacking the oxid or rusty coatings of gold particles.

Nearly all natural waters contain sodium, potassium and calcium salts in solution. By the above process these salts are broken up, in the manner described for sodium chlorid, the metallic cathions forming amalgams with the mercury, which amalgams, in the second or regenerative stage, form, with water, hydrates, which hydrates are of great value in cleaning the gold and mercury. The same action occurs when sodium, potassium or ammonium cyanid is used, that is to say, with the direct current, sodium or other amalgam is formed with the cathode, and nascent cyanogen is given up at the anode, the cyanogen, in the presence of the oxygen evolved at the anode, dissolving the fine particles of gold. Upon the regenerative step, with the reverse current, the cyanogen is recovered in a stable form, the gold replacing the sodium in the mercury.

Ordinarily alternating currents have been suggested for the purpose of amalgamation, as by William Crookes in his patent, dated Nov. 3, 1891, No. 462,535, but the present apparatus differs therefrom in that, first, there is used a mercury cathode, and, second, and still more important, the current used is not alternating in the ordinary meaning of the term, in which the alternations of the current are produced in its generation, and in which the magnitudes of the current may be represented by an undulating curve, but a current is passed through the electrolytic cell in opposite directions alternately, which is uniform for each direction but of different magnitudes and durations for the two directions. The electromotive force necessary to break up chemical compounds is many times that proper for use in hastening the reunion of the elements thereof. If the reverse current were of the same magnitude and duration as the direct current, then, by such reverse current, the sodium or potassium or calcium amalgam would be first decomposed, and then the mercury would be thrown up as mercurous and mercuric chlorid, or as cyanate of mercury. This in turn would attack the gold in suspension, and the mercury and gold would be lost in the tails. The interposed resistance is of great magnitude in proportion to the resistance of the cell, because the difference of potential on opposite sides of the cell is very small compared with that required to produce the electrolytic action in the first or direct stage, and the duration of the second stage is very much less than that of the first stage. Nevertheless, a reversal of the current is found to be actually necessary. It has been found that the voltage of the direct current can be reduced from twenty-five volts when no externally generated reverse current is used, to six volts by the present method, thus effecting a considerable saving in cost.

An incidental advantage obtained by the body of the cell being of conducting material is that the surface of the mercury adjacent to the point of contact with said conducting material is concave, instead of convex, as when contacting with insulating material. With the latter construction pockets are formed at the points where the pulp and water enter and leave the cell, which pockets become clogged with heavy particles. With the present construction the mercury forms with the conducting walls of the cell a smooth, frictionless surface on which no particles can accumulate.

It is found that the resistance of each cell is substantially the same. Although most of the chlorin separated by the direct current does not recombine with the caustic soda to form common salt in the reverse or regenerative current, and the consequence is that the solution which flows out of the first of the series of cells is distinctly alkaline in character, yet the resistance of the stream containing this alkaline solution is substantially the same as that of the stream containing the original electrolyte in the first cell. This substantial equality in the resistance of the cells is important, for, if the resistance of succeeding cells is increased, the current passing through said succeeding cells would be reduced and the current passing through the first cell or cells would be correspondingly increased. The increased current would have the effect of still further concentrating the action in such first cell or cells and reducing the action in the succeeding cell, so that eventually only the former would do effective work.

I claim:—

1. An apparatus for recovering metal from metalliferous pulp comprising a series of electrolytic cells having insoluble anodes, and mercury cathodes over which the pulp can flow in succession, means for feeding an electrolyte with the pulp to the first of said series, a source of supply of electricity, a rotary reverser, four poles therefor, a pair of conductors electrically connecting two of said poles with the poles of the source of supply, a second pair of conductors electrically connecting the other two poles with opposite sides of each of said cells, said reverser being arranged once in each rotation to successively connect electrically each conductor of the first-named pair with both conductors of the second-named pair.

2. An apparatus for recovering metal from metalliferous pulp comprising a series of electrolytic cells having mercury cathodes over which the pulp can flow in succession, means for passing a current of electricity through each of said cells to said cathode, a reverser arranged to automatically reverse the current through the cells, and means for reducing the intensity of the current so reversed.

3. An apparatus for recovering metal from metalliferous pulp comprising a series of electrolytic cells having insoluble anodes, and mercury cathodes over which the pulp can flow in succession, means for feeding an electrolyte with the pulp to the first of said series, a source of supply of electricity, a rotary reverser, four poles therefor, a pair of conductors electrically connecting two of said poles with the poles of the source of supply, a second pair of conductors electrically connecting the other two poles with opposite sides of each of said cells, said reverser being arranged once in each rotation to successively connect electrically during unequal periods of time each conductor of the first-named pair with both conductors of the second-named pair.

4. An apparatus for recovering metal from metalliferous pulp comprising a series of electrolytic cells having insoluble anodes and mercury cathodes over which cathodes the pulp can flow in succession, means for feeding an electrolyte with the pulp to the first of said series, means for passing a current of electricity through each of said cells to said cathodes, means for automatically reversing periodically said current during a shorter period than that of the direct current, and means for automatically reducing the intensity of the current so reversed.

5. An apparatus for recovering metal from metalliferous pulp comprising a series of electrolytic cells having insoluble anodes and mercury cathodes over which cathodes the pulp can flow in succession, means for feeding an electrolyte with the pulp to the first of said series, means for passing a current of electricity through each of said cells to said cathodes, and means for automatically reversing said current periodically.

6. An apparatus for recovering metal from metalliferous pulp comprising a series of electrolytic cells having insoluble anodes and mercury cathodes over which cathodes the pulp can flow in succession, means for feeding an electrolyte with the pulp to the first of said series, means for passing a current of electricity through each of said cells to said cathodes, means for automatically reversing said current periodically and means for automatically reducing the intensity of the current so reversed.

7. An apparatus for recovering metal from metalliferous pulp comprising a series of electrolytic cells having insoluble anodes and mercury cathodes over which cathodes the pulp can flow in succession, means for feeding an electrolyte with the pulp to the first of said series, means for passing a current of electricity through each of said cells to said cathodes, and means for automatically reversing said current periodically during a shorter period than that of the direct current.

In testimony whereof I have hereunto set my hand in the presence of two subscribing witnesses.

GEORGE A. JAMES.

Witnesses:
FRANCIS M. WRIGHT,
D. B. RICHARDS.